March 17, 1931.  W. W. NUGENT  1,796,613
LEAKPROOF FILTERING APPARATUS
Filed Sept. 11, 1925    4 Sheets-Sheet 1
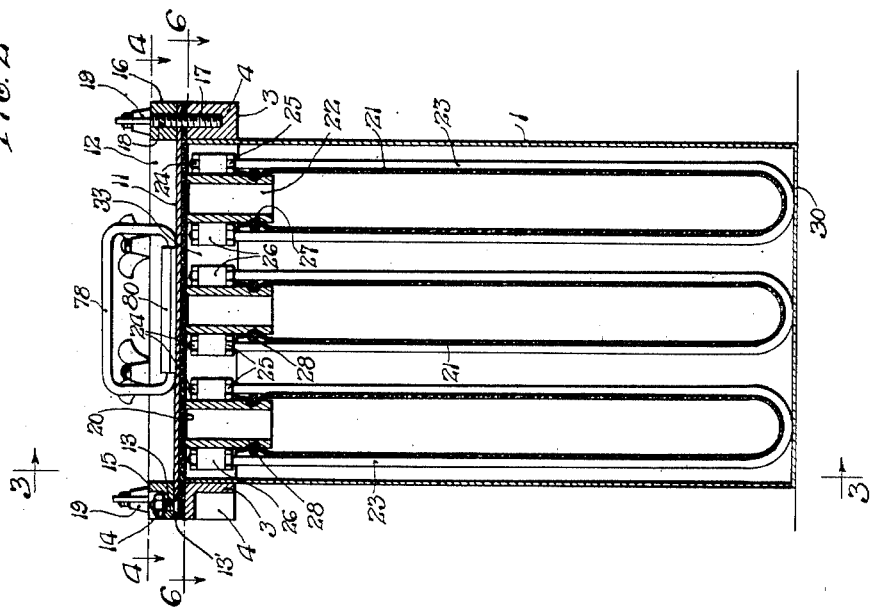
INVENTOR
William W. Nugent
By Nissen & Crane
ATTYS.

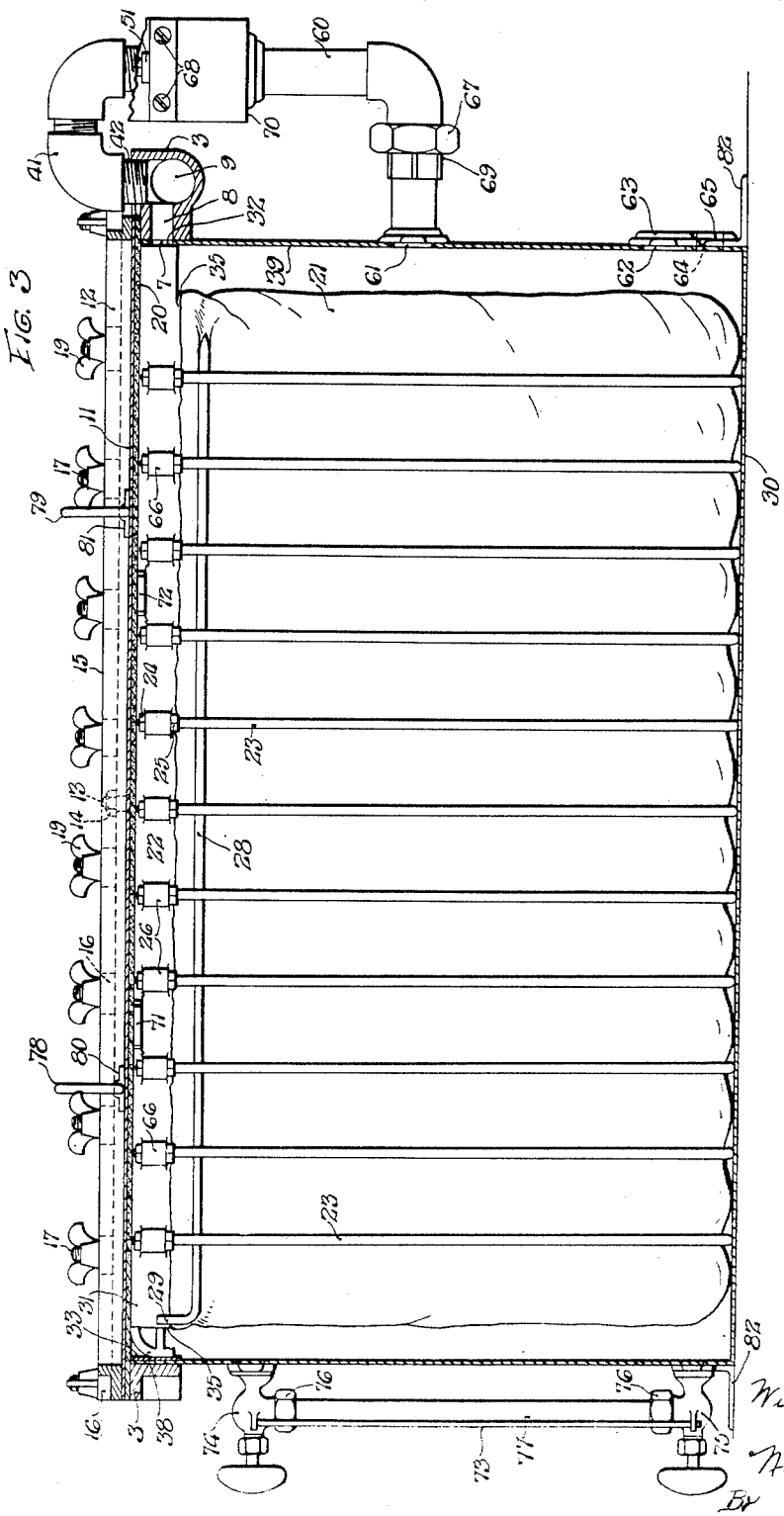

March 17, 1931. W. W. NUGENT 1,796,613
LEAKPROOF FILTERING APPARATUS
Filed Sept. 11, 1925 4 Sheets-Sheet 3
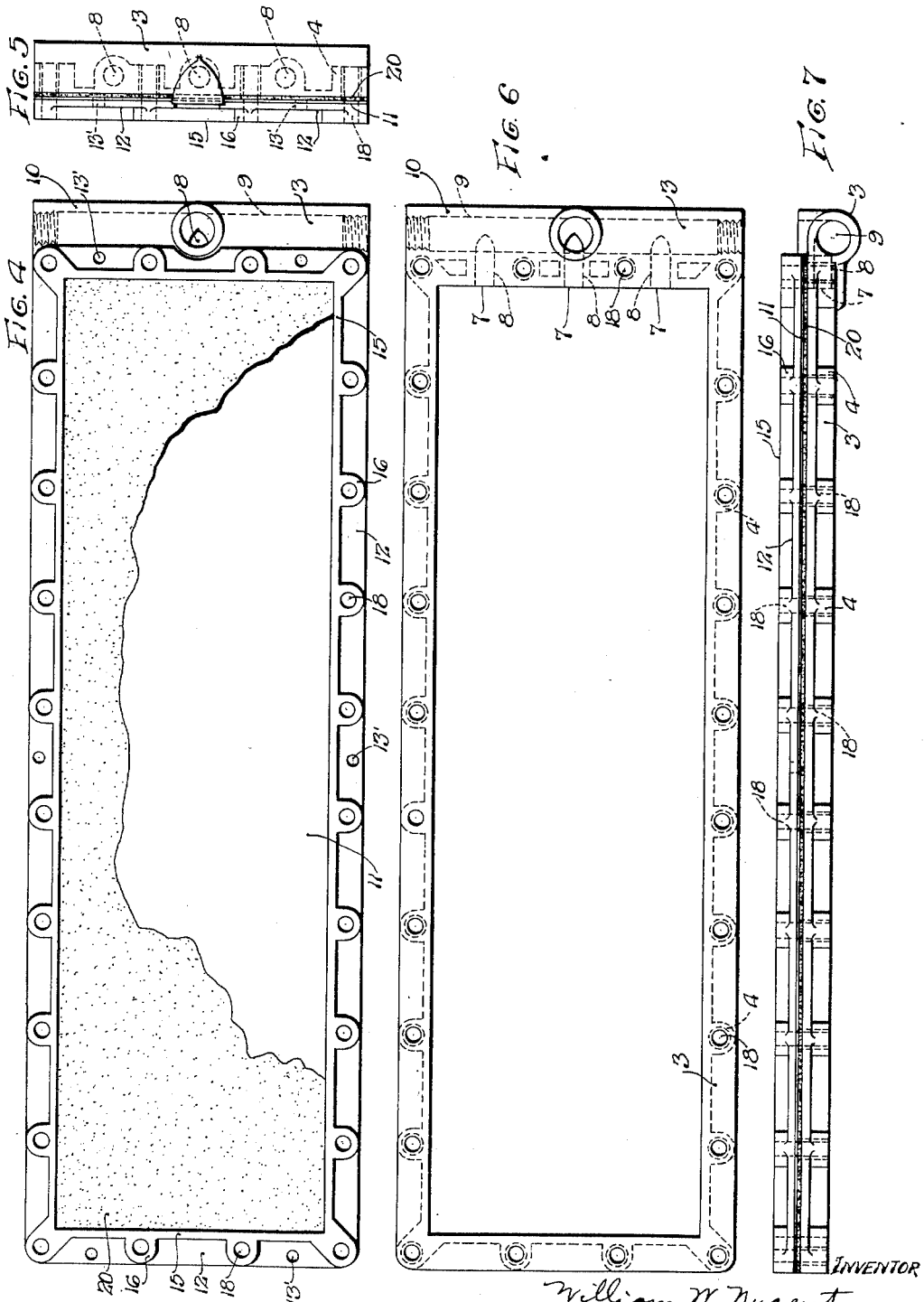

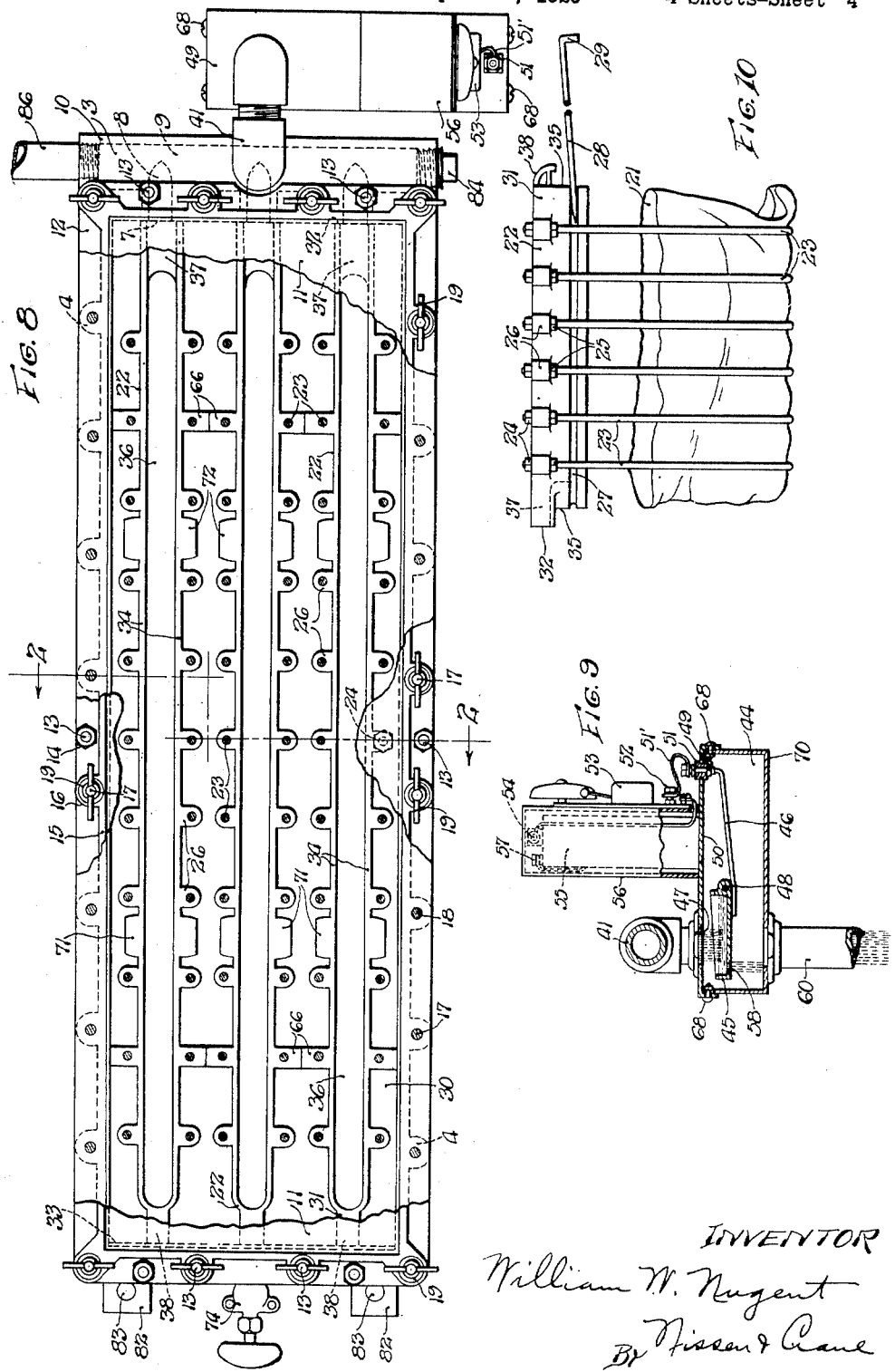

Patented Mar. 17, 1931

1,796,613

UNITED STATES PATENT OFFICE

WILLIAM W. NUGENT, OF CHICAGO, ILLINOIS

LEAKPROOF FILTERING APPARATUS

Application filed September 11, 1925. Serial No. 55,683.

This invention relates to filtering apparatus adapted to remove impurities from a lubricant, particularly lubricating oil, and one of its objects is to provide a leak-proof apparatus that may be used on trains and boats where such apparatus is subject to shock and vibration.

Another object of my invention is the provision of sealing means for closing the opening of a filtering receptacle.

Another object of my invention is to provide a filtering device comprising a plurality of filter members, any one of the same being adapted to be removed and cleaned without impairing the operation of the remaining members.

A further object of my invention is the provision of an alarm to give a warning when the filtering device is not operating properly and thus to prevent wasteful overflow of oil.

A further object of my invention is the provision of filter elements having improved bag retaining means.

Other objects will appear hereinafter, the novel features and combination being more clearly set forth in the appended claims.

In the drawings:

Fig. 1 is an end view of the filtering apparatus;

Fig. 2 is a transverse sectional view taken on a plane parallel to the end shown in Fig. 1;

Fig. 3 is a longitudinal sectional elevation taken on the line 3—3 of Fig. 2 looking in the direction of the arrows;

Fig. 4 is a plan view taken on the horizontal plane of the line 4—4 of Fig. 2;

Fig. 5 is an elevational end view of Fig. 4;

Fig. 6 is a plan view taken in the horizontal plane of the line 6—6 of Fig. 2;

Fig. 7 is an elevational side view of Fig. 6;

Fig. 8 is a top plan view of the filtering apparatus showing portions thereof removed to disclose underlying parts;

Fig. 9 is a sectional view of alarm mechanism with which the filtering apparatus is equipped; and Fig. 10 is a perspective view of one of the detachable filtering bags shown in section in Fig. 2.

Referring more particularly to Figs. 1 and 3 of the drawings it will be seen that the filtering apparatus comprises a receptacle or tank 1 having a flange 3 secured to the sides and ends of the upper portion thereof. This flange is angular in cross-section and is secured rigidly and permanently to the upper portion of the walls of the tank 1, preferably by means of solder. A top plan view of the frame-work 3 is disclosed in Fig. 6 wherein bosses 4 are shown to be integral with the frame-work and disposed below the horizontal portion of the angular flange 3.

The horizontal portion of the flange frame-work projects outwardly away from the walls of the tank 1 and is provided with a smooth machined upper surface. The end 10 of the rectangular frame at the right hand side of Fig. 6 is wider than the other three sides and is provided with ports 7 with which pipes 8 communicate. A dirty oil inlet pipe 9 is disposed below the wide flange 10 and communicates with each of the pipes 8. Both ends of the dirty oil inlet pipe are screw threaded, one end being closed by a plug 84 which may be removed for the purpose of cleaning the pipe 9 by inserting a rod or stick therethrough. The other screw threaded end is adapted to receive the end of a dirty oil supply pipe 86.

The tank or receptacle is provided with a cover comprising a rectangular metal plate 11. This metal plate is secured to a rectangular frame 12, shown in Fig. 4, by means of a plurality of flat head bolts 13 shown in Fig. 2. The bottom end of the opening 13' in the plate 11, through which the bolts 13 pass, is counter-sunk to an extent sufficient to accommodate the head of the bolt and to retain the head of the same in a position with its flat surface flush with the lower surface of the frame. The upper ends of the bolts 13 pass through openings in the frame 12 and are provided with nuts 14 which hold the plate 11 and the frame 12 together.

The upper frame 12 also comprises angular material as shown in section at 15 of Fig. 2. This frame is provided with bosses 16 which register with the bosses 4 of the lower frame 3. In Fig. 2 it will be seen that the bosses 4 of the lower framework 3 are drilled, tapped and provided with screw threaded stud bolts 17. These stud bolts 17 extend through openings 18 in the bosses 16 of the upper frame 12 and are provided at their upper ends with thumb or wing nuts 19.

It should be understood that the cover plate 11 and the bosses 16 of the upper frame 12 are provided with openings which register with the stud bolts 17 and also that the cover plate 11 and the frame 12 are rigidly secured together by bolts 13 and nuts 14 distributed around the frame-work as indicated in Figs. 4, 6 and 8.

The adjacent surfaces of the upper frame 12 and lower frame 3 are each machined smooth to effect a tight fitting relationship between the tank and the cover therefor. A rectangular sheet 20 of cork, asbestos, cotton or other fibrous, pliable material, is disposed, over the open end of the tank 1 and between the cover and the flange frame-work 3 to provide a packing so that when the thumb bolts 14 are screwed down tightly on the stud bolts 17 against the upper surface of the bosses 16 a leak-proof joint is effected. This cork packing material may be in the form of a thin sheet of the same dimensions as the metal plate cover 11 or it may be in the form of a gasket. The continuous rectangular form is preferred for reasons hereinafter set forth.

A plurality of filtering bags 21 are provided within the tank or receptacle 1. The filter bags 21 are shown in Figs. 2, 3 and 10 suspended from elongated open frames 22 and to be restrained from bulging by a plurality of U-shaped metal loops on slings 23 secured at their upper ends to the frame 22 by means of nuts 24, 25, one above a projection 26 of the frame 22 and the other below said projection, both nuts engaging the same.

Extending around the frame 22 is an endless groove 27 to form key ways on the lateral sides of said frame 22. The key 28 shown in Fig. 10 is adapted to be grasped by the handle 29 and forced between the side of the cloth bag 21 and the vertical rods 23 after the bag is pulled up so as to cover the groove 27 and consequently the opening in the frame 22. It will be seen by referring to Figs. 2 and 3 that the U-shaped members 23 rest upon the bottom 30 of the tank 1 and that the ends 31 and 32 of the frame are placed at opposite ends of the tank. The end 31 of the frame 22 is provided with an extension 38 which abuts against a wear plate 33. This wear plate acts as a filler or wedge to force the other end 32 of the frame 22 against its side of the tank and aids in supporting the filtering element in a fixed position that will not be easily altered by shock or vibration. The wear plate may be removed and replaced by a new one after its thickness becomes reduced by the sliding engagement between it and the extension 38 when the filter elements are being removed for cleaning and while they are being restored to their proper positions in the tank.

When the filtering bags become filled with impurities extracted from the oil they may be turned inside out for cleaning them in a suitable receptacle such as a pail having cleaning fluid therein for such purpose. This may readily be done by lifting out each filter element individually after the thumb bolts 14 have been unscrewed and the cover plate and cork packing removed. Two pairs of outwardly projecting flanges 71 and 72 are preferably provided on the frames 22 to enable such frames to be lifted from the tank 1. An attendant may grip one pair of flanges with the first finger and thumb of one hand and the other pair of flanges with the first finger and thumb of the other hand and conveniently lift the frame and the filter bag attached thereto from the tank. The bags may thus be removed many times without removing them from the frames before they are worn out, after which a new bag may replace a worn out one by pulling the same from the position shown in Fig. 10 to a position enclosing the lower portion of the frame 22. A wire or string may then be tied around the open edge of the bag 22 in a position adapted to force a portion of the bag near its upper end into the groove 27. Two keys of the type shown in Fig. 10 may then be inserted so as to engage the exterior sides of the cloth comprising the upper edge of the bag, one key being inserted on each side of the frame 22. The keys are adapted to engage the U-shaped members 23 and are thus maintained tightly in contact with the cloth comprising the bag.

The frame 22 is elongated and comprises two longitudinal sides 34, 34 and two rounded ends 35, 35 and is provided with an elongated opening 36 extending longitudinally from one end of the tank to the opposite end as shown in Fig. 8. Thus, it will be seen that lubricant may be introduced into the various bags 22 through the openings 36 in the frames 23. One end of each frame 22 is provided with a trough 37 which registers with a port 7 in the tank wall 39 and with the inlet pipe 8. These inlet pipes, as explained, receive the dirty oil from the supply pipe 9 and distribute the same to each of the filter bags 21. The extension or bracket 38 and the receiving end 32 of the frame 22 fit tight between the end walls of the tank to hold the filter bag 21 depending therefrom apart from the walls of the tank, 1', the wedge or wear plate 33 assures that the end 32 of the frame 22 having the trough 37 therein will be pressed firmly against the end 39 of the tank to hold the trough 37 in registration with the port 7 and the pipe 8.

It will be seen by referring to Fig. 8 that the longitudinal sides 34, 34 of the frame 22 have spaced flanges 66 extending outwardly laterally therefrom, the flanges of one longitudinal side abutting against the respective flanges of the longitudinal side of the next adjacent frame. These flanges are adapted to hold the frames 22 spaced-apart so that they will remain in proper positions in relation to the ports 7 and so that the bags will be kept apart.

An over-flow pipe 41 is connected by means of screw threads 42 with the supply pipe 9. This overflow pipe communicates with an alarm mechanism shown in Fig. 9. The overflow alarm mechanism comprises a chamber 44 wherein a pivotally mounted pan 45 having a counter-balancing arm 46 is positioned to receive the oil discharged from the pipe 41. The pan 45 is located directly below an opening 47 in the pipe 41. Thus it will be seen that some of the liquid which overflows through the pipe 41 is delivered to the pan 45, the remainder being free to flow into the compartment 44 and thence to the pipe 60 back into the tank 1 as shown in Fig 3.

The additional weight of the liquid in the pan 45 causes the same to be tilted down on its pivot 48 and also causes the counter-balancing arm 46 to be tilted upwardly to engage an insulated electric contact 49. The contact 49 is mounted on and extends through the top wall 50 of the rectangular chamber 44 and is electrically insulated from the same by insulation 51. This contact 49 is provided with a binding post which is electrically connected with a wire 51' to a terminal 52 of the electric bell mechanism 53. Thus it will be seen that normally the pan 45 is up and that the arm 46 is down with the bell circuit broken, but when the pan 45 receives oil from the overflow pipe 41 the arm 46 attached to said pan closes an electric switch completing an electric circuit from the terminal 54 of the dry cell 55 through the bell 53, switch contacts 49, 46 and through the metal casing 56 to the outer terminal 57 of the dry cell.

A restricted opening or hole 58 is provided in the bottom of the pan 45 to slowly drain the oil from the same. Therefore when the necessary adjustments have been made in the filtering apparatus the supply of oil to the pan 45 will be discontinued and the oil in this pan will be slowly drained through the hole 58. The pan will then again resume its normal position automatically and the bell 53 will discontinue to ring.

When the oil leaves the pan 45 it is free to pass from the chamber 44 to a large pipe 60 which communicates with the interior of the tank 1 through the port 61 in the end wall thereof as shown in Fig. 3. It will thus be seen that the fluid actuating mechanism for the automatic overflow alarm is in a by-pass comprising the pipes 41 and 60.

When all of the filtering elements are operating properly the dirty or used lubricant enters the filtering apparatus through the pipe 9 and is discharged into the removable filter bags 22 through the inlet pipes 8 and ports 7, there being one inlet pipe for each filter bag. The oil filters through the cloth comprising the bags 22 and collects around the same in the tank 1. A clean oil outlet opening 62 is provided with a threaded member 63 for attaching a pipe to the tank, not shown in the drawing, for conveying the filtered lubricant.

This outlet opening 62 is positioned sufficiently above the bottom of the tank to allow a thin layer of liquid to remain in the tank. Thus the lower-most layer of liquid remains in the tank and collects the small particles of solid material and impurities to form a sediment. The filtered oil that is conveyed to machinery for further use is drained from the tank at a point above this layer. A drain opening 64 is provided near the bottom of the tank 1 and below the outlet opening 62 for periodically removing the layer of impurities and solid particles that collect as sediment at the bottom of the tank. This drain opening 64 may be closed by a screw cap or it may be provided with a threaded member 65 as shown in Fig. 1. A pipe not shown in the drawings may be secured by means of the threaded member 65 to the tank 1 for carrying the contaminated liquid away.

A union 69 is preferably disposed in the by-pass comprising the pipes 41 and 60 to permit detachment of the alarm mechanism for cleaning purposes. This union may be uncoupled by unscrewing the nut member 67. The nut member 67 may be unscrewed and moved in the direction of the tank and away from the joint. The entire alarm mechanism, including the pipe 60 that is attached to the bottom thereof, may then be rotated and unscrewed from the overflow pipe 41 thus completely detaching the alarm mechanism from the tank 1.

The lower part of the alarm mechanism may be detached from the tank 1 leaving the upper portion including the battery 55, pan 45, and switch contacts 46 and 49 in their proper positions. This detachment may be effected by removing the screw-head bolts 68 from the walls of the chamber 44. When the union 69 has been uncoupled and the four bolts 68 removed the box 70 which encloses the chamber 44 may be lowered and separated from its upper cover 50 thus leaving the interior of the chamber 44 and the mechanism therein including the counter-balancing arm 46, contact member 49 and pan 45, exposed for cleaning.

A gauge 73 is secured to one end of the tank 1 for indicating the level of liquid therein. This gauge comprises upper and lower valves 74 and 75 respectively, each being provided with clamping means comprising a nut 76 for holding the ends of a transparent tubular member 77 in place. As the liquid rises in the tank 1 it also rises in the tubular member 77 thus disclosing the level of the liquid.

The closure for the open end of the tank 1 preferably comprises the rectangular open framework 3 of angular section and the thin cover plate 11. This construction affords a light and effective closure having satisfactory clamping facilities and sufficient strength to withstand the pressure exerted by the clamping members. Lifting loops or handles 78 and 79 are secured to the uppermost surface of the cover plate 11 by brackets 80 and 81, respectively. These lifting loops extend sufficiently above the plate 11 so that one may be gripped with one hand and the other with the other hand for lifting the closure from the tank after the thumb nuts have been removed. This light closure may be conveniently removed and replaced by the handles 78 and 79 without the aid of tools of any form. The framework 3 of angular section adds sufficient stiffness and strength to the closure to prevent bending of the thin plate member 11 and also distributes the pressure exerted by the thumb-screws along the entire edge of the plate.

It should be understood that the filtering apparatus is designed to be light and compact for the purpose of adapting it for installation on boats and trains where space is limited. The filtering bags 21 are supported by the frames 22 and the wire loops 23, which are securely held in place within the tank 1. The bracket 38 on one end of each frame 22 engages the wear plate 33 and forces the other end of the frame against its adjacent end of the tank 1, with the trough 37 of the frame in registration with the port 7. The position of the elements of the filtering apparatus is thus retained in a fixed relation even though the boat or train upon which it is installed is subjected to severe shock and vibration.

The tightly fitting closure presses downwardly upon the top of the filter frames 22 holding the cork plate 20 firmly over the longitudinal openings 36 in such frames thereby closing the longitudinal openings to prevent the dirty liquid from being mixed with the filtered liquid. This downward pressure is resisted by the U-shaped supporting and restraining members 23 which are rigidly secured to each frame by upper and lower nuts 24 and 25. Thus the tightly fitting closure also prevents movement of the elements within the tank 1 by exerting pressure on the top of the filter frames which are in turn supported by the U-shaped members 23 which rest upon the bottom 30 of the tank. This closure also provides a leak-proof joint that is particularly adapted to prevent spilling of the liquid.

Brackets 82 are secured to the end walls of the tank adjacent the bottom corners thereof for securing the tank 1 to the floor of a boat or train. Holes 83 are preferably provided in the brackets to receive an anchoring screw or bolt. These brackets hold the entire apparatus in a fixed position and prevent any movement thereof due to swinging and jerking in a locomotive or boat installation.

Obviously those skilled in the art may make various changes in the details and arrangement of parts without departing from the spirit and scope of the invention defined by the claims hereto appended and I wish therefore not to be restricted to the precise construction disclosed.

Having thus fully described and shown an embodiment of my invention what is desired to be secured by Letters Patent of the United States is:

1. In filtering apparatus, the combination with a tank, of a filter element in said tank, means for supplying liquid to said filter element, a by-pass from the filter element to the tank, and overflow indicating mechanism mounted in said by-pass.

2. In filtering apparatus, the combination with a tank, of a plurality of filter elements, a manifold having liquid tight connection with said filter elements for supplying liquid in multiple to said filter elements, and a by-pass connected between said manifold and the tank adapted to by-pass the fluid being filtered when the flow through said filter elements is restricted.

3. In filtering apparatus, the combination with a tank, of a plurality of filter elements therein each having a frame with an opening in its top, a filter bag secured to said frame and communicating with said opening and a cover adapted to effect a liquid-tight closure for the tank and also for each of said frames to prevent leakage from the filter elements into the space surrounding the same when the tank is subjected to shock or vibration.

4. In filtering apparatus, the combination with a tank, of a plurality of individual removable filter elements therein each comprising a frame having openings therein, a cover adapted to close the tank and also one side of said opening, means for securing said cover detachably to said tank to permit removal of said filter elements individually, means for mounting said filter elements in said tank in position to permit said cover to close said open top frames when said tank is closed, and filter bags having the mouths thereof communicating with said openings to close said openings on the opposite sides thereof.

5. In filtering apparatus, the combination with a tank, of a plurality of filter elements each comprising a frame with its upper side open and a filter bag connected to its lower side, means for mounting said filter elements in said tank with said open sides of said frames on top, and a horizontal cover fitting said tank to afford a liquid-tight seal for the filtering apparatus.

6. In filtering apparatus, the combination with a tank, having an open upper end, of a plurality of individually removable filter elements comprising filter bags with their upper ends open, means directing liquid to be filtered into open ends of said bags, and a closure for the tank comprising liquid-tight packing disposed over the upper open ends of said bags to close the upper ends thereof and seal the open ends of the bags from the space within the tank around the bags to prevent spilling of the liquid from the tops of the filter elements into such space.

7. In filtering apparatus, the combination with a tank, having an open top, of a frame secured to the upper edge portion of said tank, a plurality of filter elements in said tank each comprising a filter bag with an open top, a packing of sheet cork disposed over the open top of said tank and over the open tops of said bags for individually sealing each of the latter as well as said tank, a metal plate covering said cork, and means for clamping said plate and cork against said frame and against the tops of said filter elements.

8. In filtering apparatus, the combination with a tank, of a plurality of filter elements mounted in spaced relation in said tank and each having an elongated frame with its ends at the opposite end walls of the tank inside of the latter and below the upper edge thereof, and a cover for the tank and said filter elements.

9. In filtering apparatus, the combination with a tank, of a plurality of filter elements each comprising an elongated frame with its ends engaging the opposite end walls of said tank inside of the same and below the top thereof, and lateral projections on said frames in abutting relation with each other and with the walls of the tank inside of the same to maintain the filter elements in predetermined spaced relation.

10. In filtering apparatus, the combination with a tank, of a plurality of filter elements each comprising a frame with a filter bag connected thereto, projections on the ends of said frames and on the outer sides of the side frames for engaging the inner walls of the tank to space the bags therefrom, and abutting projections between said frames for spacing the bags from each other and holding said frames against lateral vibration in said tank.

11. In filtering apparatus, the combination with a tank, of filtering elements each comprising a removable frame in said tank, and abutting projections on said frames to keep the same spaced from each other while in said tank.

12. In filtering apparatus, the combination with a rectangular tank, of a plurality of elongated filter elements each comprising an elongated frame fitting in co-relation in said tank, and end projections for said frames for engaging opposite end walls of said tank to hold the frames against endwise movement.

13. In filtering apparatus, the combination with an elongated tank, of a plurality of removable filter elements each comprising an elongated frame with its ends engaging the opposite end walls of said tank, and lateral projections on said frame for engaging the side walls of the tank and for engaging the next adjacent frame to hold the frames while in the tank against lateral movement relatively to the tank.

14. In filtering apparatus, the combination with a tank, of a plurality of filtering elements therein each comprising an elongated frame with a filter bag connected thereto, means for removably supporting said filter elements in said tank and two pairs of lateral projections on each elongated frame in positions to be grasped at spaced apart points for lifting the same together with its filter bag from the tank.

15. In filtering apparatus, the combination with a tank, of a filter element comprising a frame and a filter bag suspended therefrom, and means engaging the bottom of the tank for holding said frame in the upper portion of the tank with the bag thus suspended.

16. In filtering apparatus, the combination with a tank, of a filter unit comprising a frame with a filter bag connected thereto, and means for supporting said frame on the bottom of the tank and against the opposite end walls thereof.

17. In filtering apparatus, the combination with a tank, of a removable filter element therein comprising a frame with a filter bag connected thereto, a plurality of loops connected to said frame and extending downwardly therefrom along the sides and bottom of the bag to the bottom of the tank, and projections on the ends of said frame to engage opposite walls of said tank.

18. In filtering apparatus, the combination with a tank, of a plurality of elongated filter elements therein each engaging opposite end walls of the tank and occupying the space between the side walls thereof, a plurality of loops connected to each frame to support the same on the bottom of the tank and hold said frame at the upper portion of the tank, and a cover for the tank and adapted to engage the tops of said frames to hold said loops against the bottom of the tank.

19. In filtering apparatus, the combination with a tank, of a plurality of filter elements therein each comprising an elongated frame with an open top and a filter bag suspended therefrom, open framework at the sides of each bag to support the said frames from the bottom of the tank and hold the bags spaced from each other, means for preventing lateral and endwise movements of said frames relatively to said tank while in the latter, and a cover for the tank adapted to engage said framework against the bottom of the tank and cover the openings in said frame.

20. In filtering mechanism, the combination with a tank having an open top, of a filtering unit comprising a filter bag and a frame for supporting said filter bag extending lengthwise of said rectangular tank, means adapted to engage the bottom and ends of said tank for holding up said frame, liquid conveying means at one end of said tank for delivering liquid to said filter bags, and a cover for closing the open end of said tank.

21. In filtering mechanism, the combination with a tank, of a filtering unit comprising a filter bag and a frame having a continuous groove located substantially at the bottom of the same, adapted to engage the cloth sides and ends of said bag near the upper edge of the same, of a key to recline in said groove and to engage the cloth comprising the sides of said filter bag, and restraining guides secured to said frame to prevent bulging of said filter bag, said guides being adapted to rest upon the bottom of said tank for supporting said filtering unit.

22. In filtering mechanism, the combination with a tank for receiving filtered liquid, of a filtering unit comprising a bag having an open end and an open frame, the lower portion of said frame being adapted to telescope the opening in said bag and to be secured to the material comprising the sides of the same, and restraining guides secured to the sides of said frame to prevent bulging of said bag, said guides being rigid and adapted to rest upon the bottom of said receptacle for supporting said filtering unit.

23. In filtering apparatus, the combination with a tank, of a filter element supported in said tank, means affording a liquid-tight covering for said filter element, and a by-pass from the filter element to the tank to afford passage for the liquid in the filter element when entering beyond the capacity of the latter.

24. In filtering apparatus, the combination with a filter bag having an open end, a tank for enclosing said filter bag, a frame adapted to rest on the bottom of said tank to form a suspension support for said filter bag, a cover for closing said tank to confine liquid in said filter bag and in the space therearound, and means for securing a liquid-tight engagement between said tank and said cover.

25. In filtering apparatus, the combination with a tank, of a plurality of filter elements therein, a frame disposed around the upper edge of the open top of said tank, one end of said frame being provided with an inlet and passageways leading therefrom to the filter elements in multiple, and means for directing the liquid from said passageways into the filter elements.

26. In filtering apparatus, the combination with a tank, of a frame at the upper edge thereof, filtering mechanism within said tank, means for directing liquid through one end of said frame to said filtering mechanism, and an overflow connection between said directing means and said tank.

27. In filtering apparatus, the combination with a tank, of filtering apparatus therein, means for preventing said filtering apparatus from overflowing into the tank, and an overflow extending from the filtering apparatus to an elevation above the top of the filtering apparatus.

28. In filtering apparatus, the combination with a tank, of filtering mechanism therein comprising an open topped frame with a filter bag suspended therefrom, a cover for closing the top of the tank and also the top of said frame, and an overflow connection extending from said open frame to an elevation above the same and thence into the tank, said overflow being operative when the capacity of said filter is exceeded.

29. In filtering apparatus, the combination with a tank, of filtering apparatus comprising an open topped frame with a filter bag suspended therefrom, means for supporting said filtering apparatus for removal therefrom, a detachable cover for the tank and said filtering apparatus, an overflow signal, and overflow connections for directing overflow from the filtering apparatus to an elevation above the latter and thence to the overflow signal to operate the latter to indicate that the filtering apparatus requires attention.

30. In filtering apparatus, the combination with a tank, of filtering apparatus therein, an overflow connection from the filtering apparatus to an elevation above the latter, an overflow signal, a pipe leading to said tank from said signal, and means to detachably connect said pipe to the tank and to said signal.

In testimony whereof I have signed my name to this specification on this 8th day of September A. D. 1925.

WILLIAM W. NUGENT.